Figure 1:
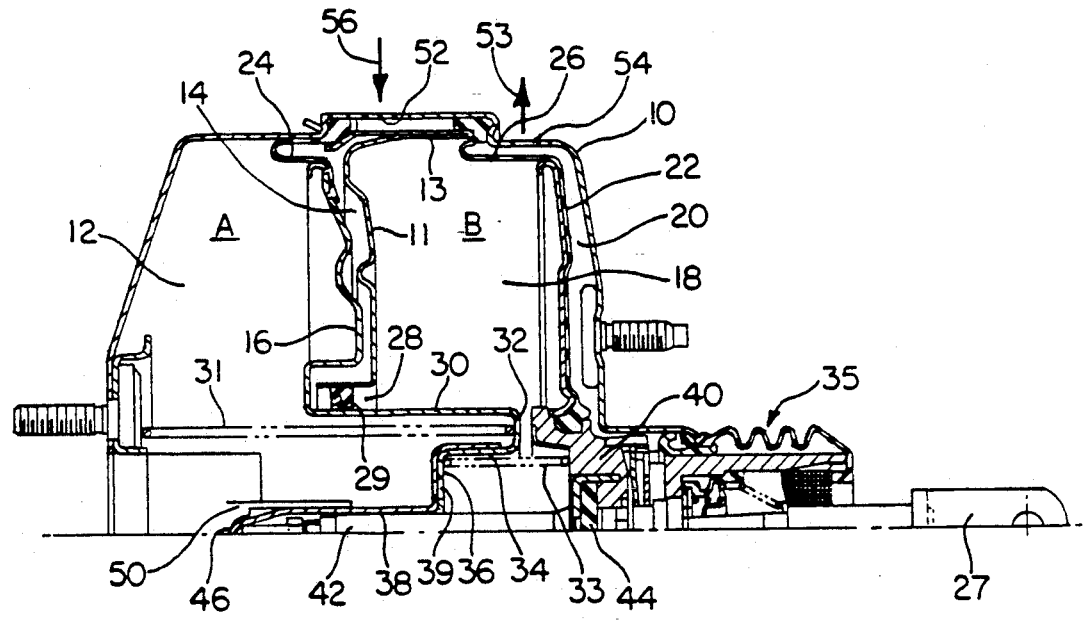

United States Patent [19]
Castel

[11] Patent Number: 5,259,666
[45] Date of Patent: Nov. 9, 1993

[54] DOUBLE BRAKE BOOSTER

[75] Inventor: Philippe Castel, Paris, France

[73] Assignee: Bendix Europe Services Techniques, Drancy, France

[21] Appl. No.: 910,202

[22] Filed: Jul. 8, 1992

[30] Foreign Application Priority Data

Jul. 30, 1991 [FR] France ................ 91 09665

[51] Int. Cl.⁵ .................. B60T 8/18; B60T 8/26
[52] U.S. Cl. .................... 303/22.1; 188/195; 188/356; 303/22.8; 303/50
[58] Field of Search ............... 303/100, 22.1, 114 PN, 303/22.8, 22.22, 22.3, 22.4, 22.5, 22.6, 22.7, 13–15, 50–56, 114.3; 188/195, 356, 357; 91/369.4

[56] References Cited

U.S. PATENT DOCUMENTS

| | | | |
|---|---|---|---|
| 2,498,438 | 2/1950 | Du Rostu ...................... | 188/195 |
| 3,101,220 | 8/1963 | Wettstein ...................... | 303/22.5 |
| 3,150,899 | 9/1964 | Berg et al. ..................... | 303/22.1 |
| 3,211,500 | 10/1965 | Lawson ......................... | 303/22.1 |
| 3,365,245 | 1/1968 | Henry-Biabaud ............... | 303/22.5 |
| 3,411,834 | 11/1968 | Henry-Biabaud ............ | 303/22.1 X |
| 3,702,207 | 11/1972 | Armstrong .................. | 188/195 X |
| 3,941,430 | 3/1976 | Kubath et al. ............... | 188/195 X |
| 4,198,101 | 4/1980 | Oberthür ..................... | 188/195 X |
| 4,304,441 | 12/1981 | Fauck et al. .................. | 303/22.5 |
| 4,493,243 | 1/1985 | Horibe ......................... | 91/369.4 |
| 4,630,706 | 12/1986 | Takayama et al. ........... | 303/22.8 X |
| 4,744,608 | 5/1988 | Pressaco ....................... | 303/22.5 |

FOREIGN PATENT DOCUMENTS

| | | |
|---|---|---|
| 0151028 | 8/1985 | European Pat. Off. . |
| 1530832 | 4/1969 | Fed. Rep. of Germany . |
| 2422676 | 11/1975 | Fed. Rep. of Germany . |
| 1340687 | 9/1963 | France ............. 303/22.5 |
| 58-1170656 | 10/1983 | Japan . |
| 59-089258 | 5/1984 | Japan . |
| 60-166553 | 8/1985 | Japan . |
| 600762 | 4/1948 | United Kingdom ........... 303/22.5 |

*Primary Examiner*—Douglas C. Butler
*Attorney, Agent, or Firm*—Larry J. Palguta; Ken C. Decker

[57] ABSTRACT

The invention relates to a double brake booster for a motor vehicle, provided with a valve enabling the boost ratio to be varied as a function of the load of the vehicle. In addition to two pistons (64, 66) articulated to an arm (72), this valve comprises a pusher (80) driven by a third piston (68), to a first face of which is applied a first force representative of the load of the vehicle and to a second face of which is applied a second force of elastic nature, in opposition to the first, this third piston adopting, under the effect of the first and second forces, an equilibrium position which determines that of a variable bearing point for the lever which constitutes the arm (72). Moreover, the arm, the pusher and the three pistons are mounted in the same body, the arm and the pusher being housed in a single cavity (74) which is defined in this body and subjected to a low pressure, and toward which the second faces of the three pistons are turned.

3 Claims, 1 Drawing Sheet

DOUBLE BRAKE BOOSTER

The present invention relates generally to vacuum boosters used on motor vehicles to provide braking assistance for these and more specifically a double booster, also called a tandem booster, making it possible to increase the brake assistance.

More particularly still, the invention relates to a double brake booster for a motor vehicle, comprising, in an outer casing, a stationary partition delimiting a front volume and a rear volume within the casing, these volumes both being divided sealingly into respective front and rear chambers by means of respective independent front and rear movable partitions, at least one elastic means tending to displace one of the movable partitions rearwards, at least one passage connecting the two front chambers, a pressure difference being established between the front and rear chambers of the rear volume by a first valve means during the actuation of a control rod in order to actuate an output rod, and a second valve means being provided for varying the pressure difference between the chambers of the front volume as a function of. on the one hand, the pressure prevailing in the rear chamber of the rear volume and, on the other hand, the load of the vehicle, this second valve means comprising a first piston, to a first face of which is applied the pressure prevailing in said rear chamber of the rear volume and a second face of which is mounted rotatably at a first end of an arm, a second piston, of which a first face controls a shutter capable of connecting said rear chamber of the front volume to the atmosphere and a second face is mounted rotatably at a second end of said arm, a pusher adopting a position which is a function of said load and determining a variable bearing point for said arm in such a way that the latter forms a lever.

Such a booster, which enables the brake boost pressure to be modulated as a function of the load of the vehicle, is described, for example, in Patent Application JP-A-59,089,258.

Despite its functional advantage, the device described in this prior document is of expensive and tricky construction and the object of the present invention is to alleviate these drawbacks.

For this purpose, the booster of the invention is essentially characterised in that it comprises a third piston, to a first face of which is applied a first force representative of the load of the vehicle and to a second face of which is applied a second force of elastic nature, in opposition to the first, this third piston adopting, under the effect of the first and second forces, an equilibrium position which determines that of said variable bearing point and in that the arm, the pusher and the three pistons are mounted in the same body, the arm and the pusher being housed in a single cavity, which is defined in this body and subjected to a low pressure, and towards which the second faces of the three pistons are turned.

One end of the pusher is preferably provided with a first roller, rolling on an internal surface of said cavity in a direction substantially axial in relation to said arm, and with a second roller, translationally driven at the same time as the first roller, and offering said arm a bearing surface located between the two ends of this arm and constituting said variable bearing point.

Figure 2:
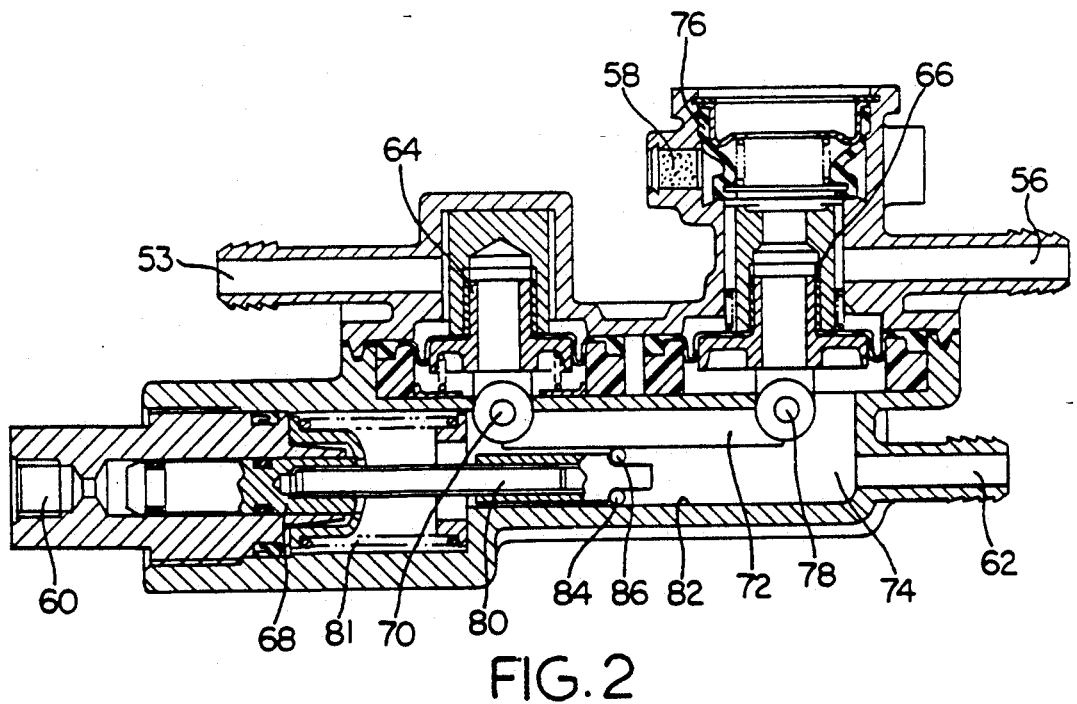

The invention will now be described by way of example with reference to the accompanying drawings in which FIG. 1 shows a diagrammatic half-section through a double brake booster produced according to the invention and FIG. 2 shows a diagrammatic section through the second valve means according to the invention.

By convention, the direction in which the components are displaced when actuated is called the "front" and the direction in which the components are displaced to return to their rest position the "rear". Thus, in the Figure, the front is located on the left and the rear is located on the right.

Referring to FIG. 1, the double booster illustrated comprises, conventionally, an outer casing 10, the interior of which is divided into a front volume A and a rear volume B by means of a stationary partition 11.

The front volume A is divided into a front chamber 12 and a rear chamber 14 by means of a movable wall 16. Likewise, the rear volume B is divided into a front chamber 18 and a rear chamber 20 by means of a movable wall 22. Each movable wall 16,22 is equipped with a respective diaphragm 24,26, the outer peripheral edge of which is fastened sealingly to the outer casing 10 in order to separate the front chambers 12,18 sealingly from the rear chambers 14,20 of each volume.

Conventionally, the front chambers of each volume communicate with one another and are connected to a vacuum source.

During the actuation of the input rod 27 connected to a brake pedal (not shown), valve means 35 interrupt this communication and allow air at atmospheric pressure to penetrate into the rear chamber 20 of the rear volume B, thereby causing a pressure difference on the movable wall 22 which thus advances counter to the action of the return spring 31, and provide the desired assistance in the actuation of a master cylinder (not shown).

The front 16 and rear 22 movable partitions are independent of one another.

In the embodiment illustrated in FIG. 1, the stationary partition 11 comprises a central orifice 28, in which a rearwardly directed cylindrical extension 30 of the front movable partition 16 slides sealingly by means of a gasket 29. This extension 30 is connected by means of a radially inward-directed shoulder 32 to a cylindrial extension 34 directed forwards. This extension 34 is connected by means of a radially inward-directed shoulder 36 to a cylindrical extension 38 directed forwards and closed at its front end by means of a bottom 46.

The movable partition 16 thus formed, together with its parts designated by 30,32,34,36,38 and 46, therefore constitutes a continuous movable wall isolating the front chamber 12 from the rear chamber 14 of the front volume A. The passage connecting the two front chambers 12 and 18 is obtained in a very simple way by an orifice 39 made directly in the front movable partition 16.

The movable partition 22 of the rear volume is conventional and forms the skirt of the piston 40 actuated by the valve means 35 and actuating an output rod 42 by means of a reaction disc 44. The output rod 42 penetrates with play into the cylindrical extension 38 and, in the rest position shown, comes up against the bottom 46.

The rear movable partition 22 is returned to the rest position by a spring 33 which bears on the rear face of the front movable partition 16 on its shoulder 36, so that the two springs 31 and 33 bear on either side of the movable partition 16.

The output-rod 42/cylindrical-extension 38 assembly actuates a master cylinder, of which only the rear part 50 of the piston has been shown. It will thus be appreciated that the actuation of the booster by the input rod 27 brings about the actuation of the master cylinder in a way identical to that of a conventional booster.

Now in order to modulate the assistance as a function of the load, a pressure which is a function of that prevailing in the rear chamber 20 of the rear volume B and of the load of the vehicle is applied to the rear chamber 14 of the front volume A with the aid of a second valve means, as illustrated in FIG. 2.

An orifice 54 made in the outer casing 10 makes it possible to tap the pressure prevailing in the rear chamber 20 of the rear volume B by way of a conduit 53.

Another orifice 52 makes it possible to connect a conduit 56 to the rear chamber 14 of the front volume A. The conduits 53 and 56 have been represented symbolically in FIG. 1, but are given in more detail in FIG. 2, to which reference will now be made.

The second valve means comprises a plurality of conduits. As has been seen, the conduit 53 is connected to the rear chamber 20 of the rear volume B; the conduit 56 is connected to the rear chamber 14 of the front volume A; the conduit 62 is connected to the vacuum source, to which, for example, the two front chambers 12 and 18 are connected; and the conduit 60 is connected to a fluidic detector (not shown) of the load of the vehicle.

Such a detector will not be described here. It can advantageously consist of a bearing piece for a suspension spring, as described in document FR-A-2,649,046, forming a sensor of the pressure prevailing in a sealed chamber provided between a suspension spring and a base.

The valve means illustrated comprises three pistons 64,66,68 arranged so as to slide sealingly in the same body.

One face of the piston 64 receives the pressure prevailing in the rear chamber 20 of the rear volume B by way of the conduit 53.

The other face of this piston 64 is mounted rotatably by means of an axle 70 at the end of an arm 72 in a single chamber 74 defined in the body of this second valve means and connected to the vacuum source by the conduit 62.

The piston 66 has a face capable of operating a valve shutter 76 opening or closing communication between an inlet of air at atmospheric pressure 58 and the conduit 56 connected to the rear chamber 14 of the front volume A. The other face of this piston 66 is mounted rotatably at the other end of the arm 72 by means of an axle 78.

The piston 68 receives on one of its faces a pressure which is a function of the load a vehicle and which has come from the pressure detector by way of the conduit 60. Its other face has an extension forming a pusher 80. The piston 68 is returned to the rest position by means of a prestressed spring 81.

The end of the pusher 80 opposite the piston 68 is equipped with an element bearing, on the one hand, on a stationary surface 82 of the chamber 74 and, on the other hand, on the arm 72 between its two end axles 70,78. This element advantageously consists of two rollers 84,86, thus avoiding generating excessively high frictional forces and determining a variable bearing point on the arm 72 in such a way that the arm 72 forms a lever.

It will be appreciated that, with this arrangement, the piston 68 assumes a position which is a function of the load of the vehicle and which determines that of the bearing point of the roller 86 on the arm 72.

Thus, during a braking controlled by the actuating rod 27, the pressure in the rear chamber of the rear volume B will move the piston 64. The movement of the latter is transmitted to the piston 66 with a multiplying coefficient which is a function of the exact position of the roller 86 on the arm 72, that is to say of the load of the vehicle.

The assistance afforded by the booster according to the invention is therefore accurately modulated as a function of the load of the vehicle. Since the reaction disc 44 does not receive the counterreaction of the force exerted by the movable partition 16 of the front volume A, the assistance provided by the front volume A is consequently not felt by the driver.

Although only one embodiment of the invention has been described, it is clear that many modifications can be made by an average person skilled in the art, without departing from the scope of the present invention.

It will be possible, for example, to use air or some other gas under pressure instead of atmospheric pressure. Likewise, the front and rear volumes need not have the same diameter, and the front volume can consist of a single additional chamber.

I claim:

1. A double brake booster for a motor vehicle, comprising, in an outer casing, a stationary partition delimiting a front volume and a rear volume within the casing, the volumes both divided sealingly into respective front and rear chambers by means of respective independent front and rear movable partitions, at least one elastic means tending to displace rearwardly one of the movable partitions, at least one passage connecting the two front chambers, a pressure difference established between the front and rear chambers of the rear volume by first valve means during the actuation of a control rod in order to actuate an output rod, and second valve means provided for varying the pressure difference between the chambers of the front volume as a function of both the pressure prevailing in the rear chamber of the rear volume and a load of the vehicle, the second valve means comprising a first piston to a first face of which is applied the pressure prevailing in said rear chamber of the rear volume and a second face mounted rotatably at a first end of an arm, a second piston of which a first face controls a shutter for connecting said rear chamber of the front volume to atmosphere and a second face mounted rotatably at a second end of said arm, a pusher adopting a position which is a function of said load and determining a variable bearing point for said arm in such a way that the arm forms a lever, characterized in that the second valve means comprises a third piston to a first face of which is applied a second force representative of the load of the vehicle and to a second face of which is applied a second force of elastic nature and in opposition to the first force, the third piston adopting, under the effect of the first and second forces, an equilibrium position which determines the position of said variable bearing point, and the arm, pusher and three pistons located in one body, the arm and pusher housed in a single cavity which is defined in the body and subjected to a low pressure and toward which the second faces of the three pistons are oriented.

2. The booster according to claim 1, characterized in that one end of the pusher is provided with a first roller rolling on an internal surface of said cavity and in a direction substantially axial in relation to said arm, and with a second roller driven translationally with the first roller, to provide said arm with a bearing surface located between two ends of the arm and constituting said variable bearing point.

3. The booster according to claim 1, characterized in that said first force is generated by a fluidic load sensor.

* * * * *